United States Patent

Kaneko

[15] 3,678,504

[45] July 18, 1972

[54] SEGMENT ANALOG-TO-DIGITAL OR DIGITAL-TO-ANALOG CONVERTER

[72] Inventor: Hisashi Kaneko, Tokyo, Japan

[73] Assignee: Bell Telephone Laboratories, Incorporated, Murray Hill, N.J.

[22] Filed: Aug. 5, 1970

[21] Appl. No.: 61,220

[52] U.S. Cl. ..................................340/347 DA, 340/347 AD

[51] Int. Cl. ..........................................................H03k 13/02

[58] Field of Search ..............................340/347 DA, 347 AD

[56] References Cited

UNITED STATES PATENTS 3,396,380 8/1968 Ohashi ............................340/347 DA

*Primary Examiner*—Thomas A. Robinson

*Attorney*—R. J. Guenther and E. W. Adams, Jr.

[57] ABSTRACT

A segment-type decoder in which binary signals representing the mantissa of a digital signal to be decoded are applied to a linear coder component to produce an output current from which there is added to or subtracted a first predetermined current in accordance with a sign bit. The resulting current is applied to a switched amplifier whose gain is determined by the characteristic portion of the digital signal and from whose output is added or subtracted a second predetermined current in accordance with the sign bit to yield an analog representation of the input signal.

4 Claims, 6 Drawing Figures

INVENTOR
H. KANEKO
BY Leonard H. Arnold
ATTORNEY

TABLE 1

| L | 0 | 1 | 2 | 3 |
|---|---|---|---|---|
| ΔL | 1 | 2 | 4 | 8 |

TABLE 2

| | | | | $e_0=1$ | | | | | $e_0=0$ | | | | |
|---|---|---|---|---|---|---|---|---|---|---|---|---|---|
| | | | | U | L=0 | | L=1 | | U | L=0 | | L=1 | |
| $e_3$ | $e_4$ | $e_5$ | V | | W | Y | W | Y | | W | Y | W | Y |
| 1 | 1 | 1 | 7 | 31 | =U | 14 | 62 | 45 | -17 | =U | 0 | -34 | -17 |
| 1 | 1 | 0 | 5 | 29 | | 12 | 58 | 41 | -19 | | -2 | -38 | -21 |
| 1 | 0 | 1 | 3 | 27 | | 10 | 54 | 37 | -21 | | -4 | -42 | -25 |
| 1 | 0 | 0 | 1 | 25 | | 8 | 50 | 33 | -23 | | -6 | -46 | -29 |
| 0 | 1 | 1 | -1 | 23 | | 6 | 46 | 29 | -25 | | -8 | -50 | -33 |
| 0 | 1 | 0 | -3 | 21 | | 4 | 42 | 25 | -27 | | -10 | -54 | -37 |
| 0 | 0 | 1 | -5 | 19 | | 2 | 38 | 21 | -29 | | -12 | -58 | -41 |
| 0 | 0 | 0 | -7 | 17 | | 0 | 34 | 17 | -31 | | -14 | -62 | -45 |

SEGMENT ANALOG-TO-DIGITAL OR DIGITAL-TO-ANALOG CONVERTER

BACKGROUND OF THE INVENTION

A conventional segment type decoder comprises four basic elements: an input switch, a linear decoder component, a switched amplifier, and a subtractor circuit connected in tandem. The switched amplifier is operated in accordance with a portion of the signal to be decoded, which portion is denoted as the "characteristic." Briefly, the "characteristic" portion of the signal determines which portion of the segmented characteristic the decoder is to operate within. The sign bit controls the input switch and connects a voltage of either plus E or minus E to the input of the linear decoder component which, in turn, is operated in accordance with that portion of the binary code known as the "mantissa." The "mantissa" determines the proper location within the chosen segment.

While such a prior art encoder has been found to be generally satisfactory, it has an inherent inaccuracy due to the fact that the input switch has a finite impedance associated with it so that the voltage across the networks of the decoder varies in accordance with that impedance.

OBJECTIVE OF THE INVENTION

It is an object of this invention to eliminate the inherent inaccuracy of segment-type coder-decoders (CODECS).

SUMMARY OF THE INVENTION

In accordance with this invention there is added to or subtracted from the output of the linear decoder component a first predetermined current in accordance with the sign bit. The resulting current is applied to a switched amplifier whose gain is determined by the characteristic signal and from whose output there is added or subtracted a second predetermined current to yield an analog representation of the input signal.

BRIEF DESCRIPTION OF THE DRAWINGS

This invention will be more fully comprehended from the following detailed description taken in conjunction with the drawings in which.

DETAILED DESCRIPTION

Figure 1:
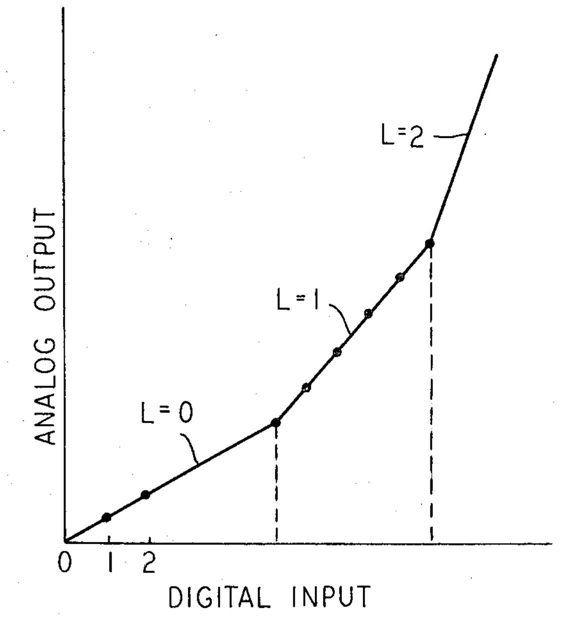
FIG. 1 shows the positive portion of the segment type companding characteristic.

The positive portion of the characteristic of a digital-to-analog converter is shown in FIG. 1. The analog output is piece-wise linearly related to the digital input which is generally given by the binary code. A first portion of the binary code determines which segment of the decoder characteristic the decoder is operating within. This portion of the code is denoted as a "characteristic signal." A second portion of the digital input digital called the "mantissa" determines the location of the analog output within the segment previously determined by the "characteristic signal."

Figure 2:
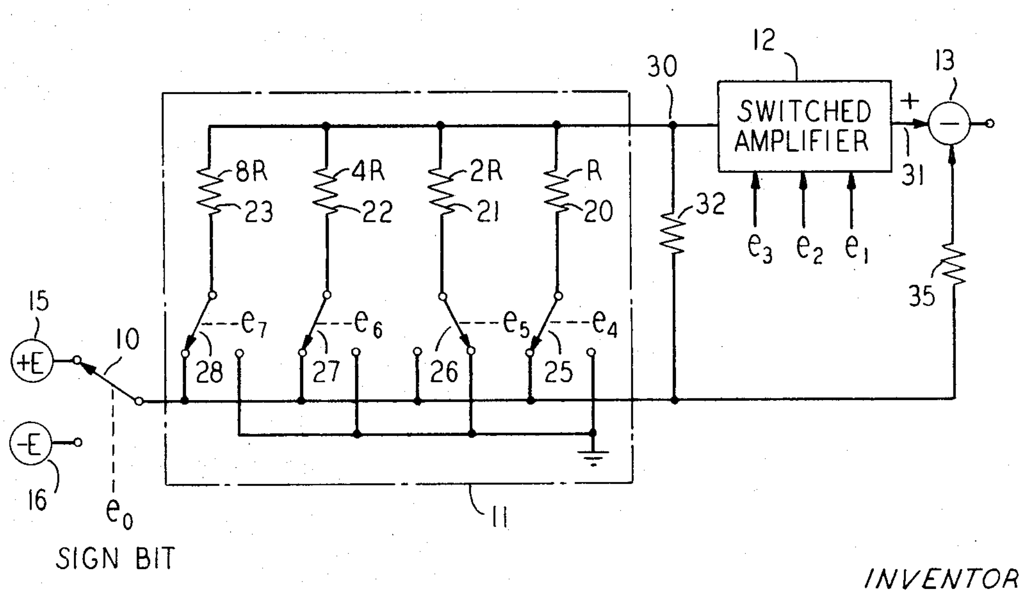
FIG. 2 PRIOR ART
FIG. 2 shows a prior art segment type decoder.

A prior art segment type decoder is shown in FIG. 2. This decoder has four basic elements: an input switch 10, a linear decoder network 11, a switched amplifier 12, and a subtractor circuit 13. The digital input signal, in this particular example, consists of seven bits denoted as $e_1$ through $e_7$, together with a sign bit denoted as $e_0$. The switched amplifier 12 has its gain determined by the first three bits of the digital signal $e_1$, $e_2$ and $e_3$. The sign bit $e_0$ governs the position of the input switch and when the sign is positive, the switch is connected to the source of voltage 15 having a value +E. When the sign bit represents an analog signal having a negative value, a source of voltage 16 having a value −E is connected to the input of the linear decoder network.

In accordance with standard engineering practice, the resistors 20, 21, 22, and 23 of the linear decoder network are related in binary fashion so that the position of the various switches 25, 26, 27, and 28 operated in accordance with the digital bits $e_4$ through $e_7$, respectively, cause to be generated at terminal 30 a current representative, in analog form, of the digital signal determined by digits $e_4$ through $e_7$.

To the current at terminal 30 there is added a fixed current determined by the value of resistor 32 and the resulting current is then applied to the input of the switched amplifier 12 whose gain determines which segment of the characteristic the overall apparatus is operating upon. At the output terminal 31 of the switched amplifier 12, there is a subtractor circuit 13 so that a fixed current determined by resistor 35 is subtracted from the output of the switched amplifier. As is known to those skilled in the art, this apparatus functions as a segment digital-to-analog converter.

The problem with the prior art apparatus, shown in FIG. 2, arises from the fact that the switch 10 at the input of the linear decoder element 11 has a finite impedance associated with it so that the voltage across the resistive networks of the linear decoder component 11 varies in accordance with the impedance of the input switch. This results in inaccuracy. In accordance with the present invention, such inaccuracy is overcome by providing a new structure for a segment digital-to-analog converter. Briefly, in accordance with this invention the mantissa signals are applied to the linear decoder component to produce an output current from which there is added to or subtracted a first predetermined current in accordance with a sign bit. The resulting current is then applied to the input of a switched amplifier whose gain is determined by the characteristic portion of the input signal and from whose output there is added or subtracted a second predetermined current to yield an analog representation of the digital input signal.

Figure 3:
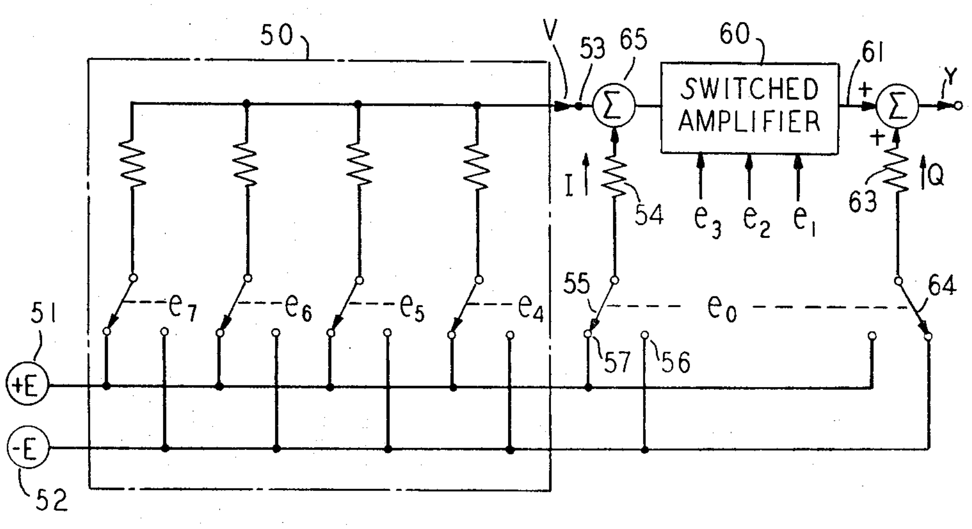
FIG. 3 shows a segment type decoder embodying the present invention.

A generalized form of digital-to-analog converter embodying the present invention is shown in FIG. 3. A segment-type decoder may be shown to have the characteristic $$Y=[2^L(V+I)-Q]$$
$$Y=-[2^L(V-I)+Q] \qquad (1)$$

This characteristic may be obtained by the following apparatus. First linear decoder component 50 has applied to its switches sources of voltage 51 and 52 having values of +E and −E, respectively. At the output of the terminal 53 of linear decoder component 50, there is provided a resistor 54 of fixed value, and a switch 55. Switch 55 is operated by the sign bit so that when the sign bit represents a positive analog signal the switch is connected to pole 57 and when it represents a negative signal, it is connected to pole 56. A constant bias is applied across switch 55 and resistor 54 so that there is added to or subtracted from the current generated by the linear decoder component in summing circuit 65 at terminal 53 a constant value of current $I$ in accordance with the sign bit. The resulting current is applied to the input of a switched amplifier 60 which serves to multiply the value of the current by the gain determined by the characteristic bits $e_1$, $e_2$, and $e_3$. The output terminal 61 of the switched amplifier is connected to one input terminal of an adder circuit whose second input terminal is connected to a resistor 63 which, in turn, is connected to a switch 64 operated in accordance with the state of the sign bit. More particularly, switch 64 is switched between voltage sources 52 and 51 in accordance with whether the sign bit is positive or negative, respectively. If the output current from the linear decoder component 50 is denoted $V$, and if the current through resistors 54 and 63 are denoted as $I$ and $Q$, respectively, then the above-stated equations are satisfied by virtue of the apparatus shown in FIG. 3.

Figure 4:
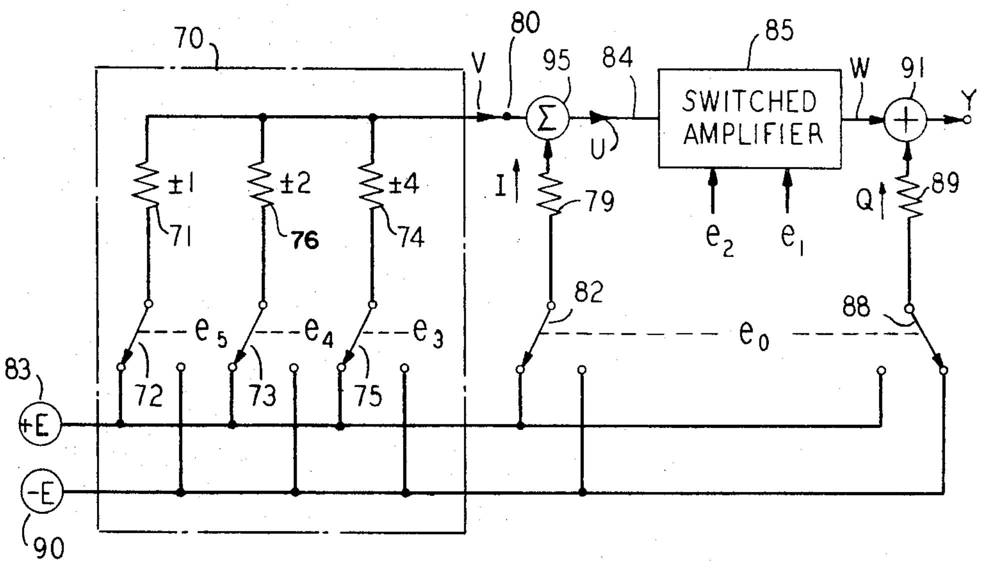
FIG. 4 shows a simplified version of a decoder embodying the present invention which is useful for explanatory purposes.

A further understanding of the present invention may be obtained by virtue of the simple decoder shown in FIG. 4. In FIG. 4, the characteristic is determined by two bits of the input signal, $e_1$ and $e_2$ and the mantissa is determined by three bits, $e_3$, $e_4$, and $e_5$. Since the linear decoder component 70 consists of only three sections of resistors and switches, it is capable of generating current in the range of +7 to −7 units of amplitude. Thus, the first stage consisting of resistor 71 and switch 72 may generate ±1 unit, the second stage consisting of resistor 76 and switch 73 is capable of generating ±2 units, the third stage consisting of resistor 74 and switch 75 is capable of generating ±4 units of current. Referring to the Table 2 of FIG. 5 there is shown in the lefthand portion the various possible combinations of values for the digits $e_3$, $e_4$, and $e_5$ and, as may be seen, the range of current which is denoted $V$ is from +7 to −7 units of amplitude. $V$ is the output current from the linear decoder as shown at terminal 80 in FIG. 4.

In this particular embodiment of the invention a bias of ±24 units of current, which is six times greater than the most significant digit amplitude (±4) is added to or subtracted from the current at terminal 80. This value was determined in the following manner: For N character bits and a parameter A, with A to equal one-half, then $i$ the current through resistor 79, which is added to or subtracted from the current at terminal 80, is determined by the following equation $$i = (3 \times 2^N + 2A - 1) \qquad (2)$$

therefore $i = 3 \times 2^N$ and, where $N = 3, i = 24$.

When the sign bit is positive, switch 82 is connected to source 83 of positive voltage $+E$ with the result that 24 units of current are added to $V$ in summing circuit 95 to yield the current U which is applied to the input terminal 84 of the switched amplifier 85. When the sign bit is negative, 24 units of current are subtracted from $V$ by switch 82 connecting to source 90. The result of such addition or subtraction in accordance with the sign bit is shown in two columns denoted U in Table 2 of FIG. 5. In the first column denoted U, beneath the heading "$e_o = 1$," 24 units of current have been added to the preceding value of $V$. In the second column headed, "$e_o = 0$," 24 units of current have been subtracted from the value of $V$ to yield U.

The switched amplifier 85 has four possible values of gain which are determined by the characteristic bits $e_1$ and $e_2$ which can denote four possible values of the characteristic $L$, such as 0, 1, 2, and 3. When $L = 0$, the gain is 1, when $L = 1$, the gain is 2, when $L = 2$, the gain is 4, and when $L = 3$, the gain is 8. This relationship between the value of $L$ as determined by $e_1$ and $e_2$ and the gain of the switched amplifier $\Delta L$ is shown in Table 1 of FIG. 5.

When $L = 0$ the amplifier 85 has a gain of 1, and the value of the amplifier output, denoted W, is the same as the input current U. When $L = 1$ the value of the output current from the amplifier is twice U. These results are shown in Table 2 of FIG. 5, where the output of the amplifier is denoted as W.

In accordance with this invention the output current from the amplifier 85 has added to or subtracted from it a constant value of current $2^{n+1} + 1 = 17$, units of amplitude by virtue of the operation of switch 88 and resistor 89. Switch 88 operates to connect the resistor 89 between sources 83 and 90 in accordance with whether the sign bit is negative or positive, respectively. The resulting current $Q$ of 17 units of amplitude is either added to or subtracted from W by means of adder circuit 91. As shown in Table 2 of FIG. 5 where the sign bit is positive, $e_1 = 1$, 17 units of current are subtracted from W to yield the values of $Y$ shown in the two specific examples. As shown in the right hand portion of Table 2 of FIG. 5 when the sign bit is negative 17 units of current are added to W to yield $Y$.

Figures 5, 6:
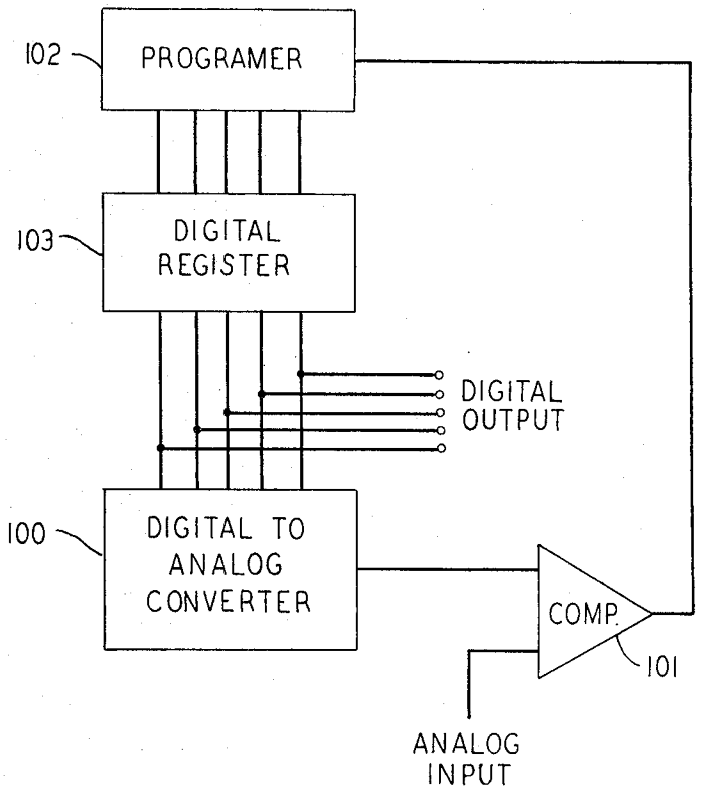
FIG. 5 is a table showing current values obtained in the operation of the apparatus shown in FIG. 4.
FIG. 6 shows a block diagram of an analog-to-digital converter, or encoder, embodying the principles of the present invention.

While the invention has been described in connection with a digital-to-analog converter it should be recognized by those skilled in the art that the decoder apparatus may be employed together with other circuitry in order to accomplish encoding, or analog-to-digital conversion. An arrangement for accomplishing such a result is shown in FIG. 6. A digital-to-analog converter 100 of the type shown in FIG. 3 and 4 has its output connected to one input terminal of a comparator 101. The other input terminal of the comparator is connected to receive the analog input signal and the output of comparator 101 is applied to a programmer 102 which, in turn, operates a digital register 103 which, in turn, controls the converter 100. The actual successive approximations required to perform the encoding operation by using a digital-to-analog converter 100 in the configuration shown in FIG. 6 is discussed in detail on Pages 8 and 9 and FIG. 1.6 of *Analog-to-Digital/Digital-to-Analog Conversion Techniques* by David F. Hoeschele, Jr., published by John Wiley and Sons, Inc., copyright 1968.

Various embodiments and modifications other than those described herein may be made by those skilled in the art without departing from the spirit and scope of the invention.

What is claimed is:

1. A segment-type decoder for decoding a digital signal comprising, in combination, a linear decoder component to which a first predetermined portion of said digital signal is applied to generate a current in accordance with that first predetermined portion of said digital signal, first apparatus responsive to a second predetermined portion of said digital signal representing the sign of said analog signal to add or subtract predetermined currents from the output of said linear decoder component in accordance with whether said second predetermined portion indicates that the digital signal represents a positive or negative analog signal, respectively, an amplifier connected to receive the output current from said first apparatus and having at least two levels of gain which levels are determined in accordance with a third predetermined portion of said digital input signal, and second apparatus responsive to said second predetermined portion of said digital signal to add or subtract predetermined currents from the output of said amplifier in accordance with whether said second predetermined portion of said digital signal indicates that the digital signal represents a negative or positive analog signal, respectively.

2. A segment-type encoder for encoding an analog signal comprising, in combination, a digital-to-analog converter which converter comprises, a linear decoder component to which a first portion of a digital signal is applied to generate a current in accordance with that portion of the digital signal, first apparatus responsive to a second portion of the digital signal to add or subtract predetermined currents from the output of said linear decoder component in accordance with whether said second portion of the digital signal indicates that the digital signal represents a positive or negative analog signal, respectively, an amplifier connected to receive the output current from said first apparatus and having at least two levels of gain which are determined in accordance with a third portion of the digital input signal, and second apparatus responsive to the second portion of the digital signal to add or subtract predetermined currents from the output of said amplifier in accordance with whether the second portion indicates that the digital signal represents a negative or positive analog signal, respectively, a comparator connected to receive the output of said digital-to-analog converter and said analog input signal to be encoded, programming means connected to receive the output signal from said comparator, and a digital register, said digital register and said programming means operating to sequentially make successive approximations and generate said digital signals so that the output of said digital register represents the digital output signal.

3. A segment-type decoder for converting a digital signal to an analog signal comprising, in combination, a linear decoder component having binary weighted networks to which are connected a positive reference voltage source and a negative reference voltage source, each said network being operated in accordance with the state of a particular bit of a first predetermined portion of said digital signal to generate a current in accordance with that portion of said digital signal, a resistor, and a switch connected to the output of said linear decoder component, said switch being operated in accordance with a second portion of said digital input signal which represents the sign of said analog signal to apply said positive reference voltage to said resistor when said signal represents a positive analog signal and negative reference voltage to said resistor when said signal represents a negative analog signal, a first summing network to sum the output of said linear decoder component and said current obtained from said resistor, an amplifier connected to receive the output current from said first summing network and having at least two levels of gain which are determined in accordance with a third predetermined portion of said digital input signal, a second summing network connected to receive the output of said switched amplifier and having a second input terminal, a resistor and a switch connected in series to said second input terminal of said second summing network said switch having two poles, a first pole connected to said first source of reference voltage and a second pole connected to a second source of said reference voltage so that when the sign bit is positive a predetermined current is subtracted from the output of said switched amplifier and when said predetermined current is negative a current is added to the output of said switched amplifier.

4. A segment-type encoder for encoding an analog signal comprising, in combination, the segment-type decoder defined in claim 3, and further comprising a comparator connected to receive the output of said decoder and the analog input signal to be encoded, programming means connected to receive the output signal from said comparator, and a digital register said digital register and said programming means operating to sequentially make successive approximations and generate the digital signals for application to said decoder so that the output of said digital register represents the digital output signal.

* * * * *